US011505157B2

(12) United States Patent
Contraire (10) Patent No.: US 11,505,157 B2
(45) Date of Patent: Nov. 22, 2022

(54) COVER PANEL FOR A CABIN OF A VEHICLE AND PROVIDED WITH A WEAKENING FOR THE OPENING OF AN UNDERLYING AIRBAG (71) Applicant: FERRARI S.p.A., Modena (IT)

(72) Inventor: Mathieu Contraire, Modena (IT)

(73) Assignee: FERRARI S.P.A., Modena (IT)

(*) Notice: Subject to any disclaimer, the term of this patent is extended or adjusted under 35 U.S.C. 154(b) by 0 days.

(21) Appl. No.: 17/357,114

(22) Filed: Jun. 24, 2021

(65) Prior Publication Data
US 2021/0402944 A1    Dec. 30, 2021

(30) Foreign Application Priority Data
Jun. 26, 2020 (IT) .................. 102020000015523

(51) Int. Cl.
B60R 21/2165 (2011.01)
B29C 59/00 (2006.01)

(52) U.S. Cl.
CPC ........ B60R 21/2165 (2013.01); B29C 59/007 (2013.01)

(58) Field of Classification Search
CPC ................................. B60R 21/2165
See application file for complete search history.

(56) References Cited

U.S. PATENT DOCUMENTS 7,168,731 B2 * 1/2007 Yasuda ............... B60R 21/2165
264/400
7,976,764 B2 * 7/2011 Schlemmer ......... B60R 21/2165
425/174
9,150,183 B2 * 10/2015 Volkmar ............. B60R 21/2165
9,771,044 B1 * 9/2017 Patnala ............... B60R 21/2165
2003/0230875 A1 * 12/2003 Lutze .................. B60R 21/2165
219/121.71

(Continued)

FOREIGN PATENT DOCUMENTS

DE      19636428 A1      3/1998
DE  102004047634 A1 *   8/2005  ......... B60R 21/2165

(Continued)

OTHER PUBLICATIONS

Search Report and Written Opinion for Italian Patent Application No. 102020000015523 dated Oct. 22, 2020, 7 pages.

Primary Examiner — Nicole T Verley
(74) Attorney, Agent, or Firm — Cantor Colburn LLP (57) ABSTRACT A cover panel for a cabin of a vehicle and provided with a weakening for the opening of an underlying airbag. The weakening consists of a sequence of not-through incisions which are separated from each other, are arranged along a weakening line, are obtained from an internal surface of the cover panel, and terminate at a non-zero distance from an external surface of the cover panel. In some sections of the weakening line there are first incisions each having a first width while in other sections of the weakening line there are second incisions each having a second width greater than the first width. The weakening line has a plurality of portions that connect to one another in at least one connection area, wherein the corresponding portions of the weakening line consist of the second incisions only while, next to the connection area, the corresponding portions of the weakening line consist of the first incisions only.

20 Claims, 8 Drawing Sheets (56) References Cited

U.S. PATENT DOCUMENTS

| | | | |
|---|---|---|---|
| 2004/0207181 A1 | 10/2004 | Hayashi et al. | |
| 2005/0134023 A1* | 6/2005 | Cowelchuk | B60R 21/2165 |
| | | | 280/732 |
| 2006/0267314 A1* | 11/2006 | Yasuda | B60R 21/2165 |
| | | | 280/732 |
| 2011/0211927 A1 | 9/2011 | Volkmar | |

FOREIGN PATENT DOCUMENTS

| | | | | |
|---|---|---|---|---|
| DE | 102006059212 A1 | | 6/2008 | |
| DE | 102007013108 B3 | * | 8/2008 | ......... B23K 26/0622 |
| DE | 102016001647 A1 | | 9/2016 | |
| DE | 102015111590 B3 | | 11/2016 | |
| DE | 102018122272 A1 | * | 3/2019 | ......... B23K 26/0624 |
| EP | 0771695 A1 | | 5/1997 | |
| EP | 1213193 A1 | | 6/2002 | |
| EP | 1371447 A1 | * | 12/2003 | ........... B23K 26/382 |
| EP | 1512587 A1 | * | 3/2005 | ......... B60R 21/2165 |
| JP | 2001502996 A | * | 3/2001 | |
| JP | 3856157 B2 | * | 12/2006 | ........... B23K 26/032 |
| WO | 2006111212 A1 | | 10/2006 | |
| WO | 2015154898 A1 | | 10/2015 | |

\* cited by examiner

COVER PANEL FOR A CABIN OF A VEHICLE AND PROVIDED WITH A WEAKENING FOR THE OPENING OF AN UNDERLYING AIRBAG

CROSS-REFERENCE TO RELATED APPLICATIONS

This patent application claims priority from Italian patent application no. 102020000015523 filed on Jun. 26, 2020, the entire disclosure of which is incorporated herein by reference.

TECHNICAL FIELD

The present invention relates to a cover panel for a cabin of a vehicle and provided with a weakening for the opening of an underlying airbag.

PRIOR ART

A cabin of a vehicle is internally covered with cover panels having externally a visible surface having a fine finish.

Arranged underneath at least one cover panel is a corresponding airbag that is normally housed (when it has not been inflated, i.e. when it has not been activated yet) in its own housing. At the airbag, the cover panel has a weakening that delimits a lid that "pops" (i.e. opens) when the airbag inflates so as to allow the deployment of said airbag.

The weakening normally consists of a not-through incision (so that it is not visible from the cabin) which delimits the periphery of the lid and, in a plan view, generally has a "Y" (i.e. a "chalice") shape or an "H" shape.

Some examples of weakenings for cover panels are disclosed in the patent applications DE19636428A1, EP0771695A1, DE102015111590, WO2015154898A1, DE102006059212A1, WO2006111212A1, and EP1213193A1.

The patent application US2011211927A1 describes a method for manufacturing a cover panel for a cabin of a vehicle and provided with a weakening for the opening of an underlying airbag; in particular, a weakening line is made by milling a series of holes along said weakening line.

DESCRIPTION OF THE INVENTION

The object of the present invention is to provide a cover panel for a cabin of a vehicle and provided with a weakening for the opening of an underlying airbag, the cover panel allowing an optimal opening of the underlying airbag and, simultaneously, not showing externally any trace of the weakening.

According to the present invention, a cover panel for a cabin of a vehicle and provided with a weakening for the opening of an underlying airbag is provided, as claimed in the appended claims.

The claims describe preferred embodiments of the present invention constituting an integral part of the present description.

BRIEF DESCRIPTION OF THE DRAWINGS

The present invention will now be described with reference to the accompanying drawings, which illustrate a non-limiting embodiment example thereof, wherein.

PREFERRED EMBODIMENTS OF THE INVENTION

Figure 1:
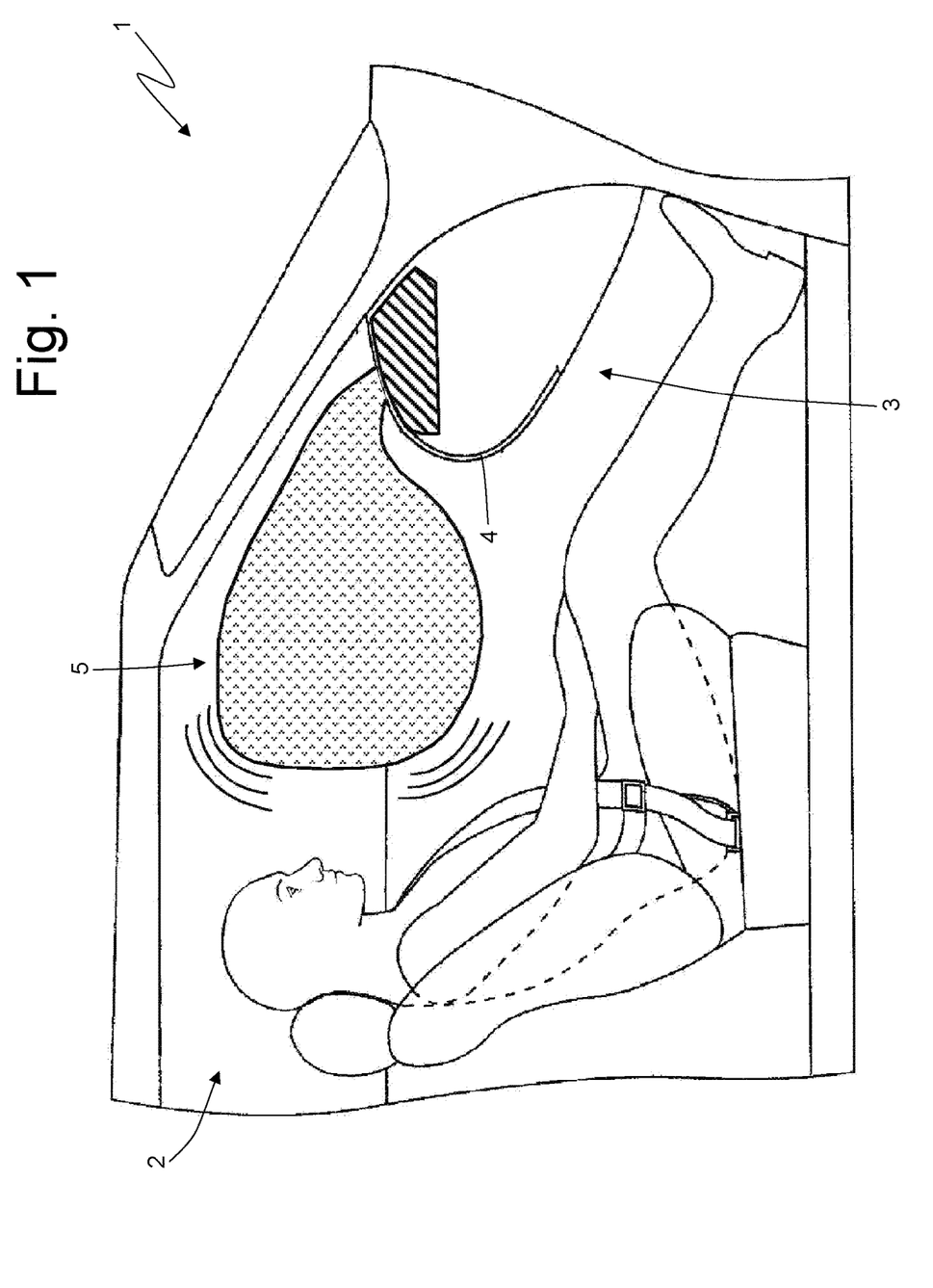
FIG. 1 is a schematic partial view of a cabin of an automobile comprising a cover panel provided with a weakening for the opening of an underlying airbag.

In FIG. 1, reference numeral 1 indicates, as a whole, an automobile provided with a cabin 2.

Some parts of the cabin 2 (in particular all parts of the dashboard 3) are covered by corresponding cover panels 4 having externally a visible surface having a fine finish. For example, the cover panels 4 can be externally covered by a foam (cheapest solution), by fabrics (intermediate solution), or by leather (most expensive solution).

Arranged underneath at least one cover panel 4 is a corresponding airbag 5 that is normally housed (when it has not been inflated, i.e. when it has not been activated yet) in its own housing. At the airbag 5, the cover panel 4 has a weakening 6 (illustrated in FIG. 2) that delimits a lid that "pops" (i.e. opens) when the airbag inflates so as to allow the deployment of said airbag.

As illustrated in the accompanying figures, the weakening 6 consists of a sequence of not-through incisions 7 and 8 (better illustrated in FIG. 7) which are separated from each other, are arranged along a weakening line 9, are obtained from an internal surface 10 of the cover panel 4, and terminate at a non-zero distance (illustrated in FIG. 7) from an external surface 11 of the cover panel 4. When the incisions 7 and 8 are made by means of a laser (for example using femtosecond technology), they generally have a (slightly) conical shape, which is a direct consequence of the way in which a laser beam "excavates" the material that makes up the cover panel 4.

Figure 7:
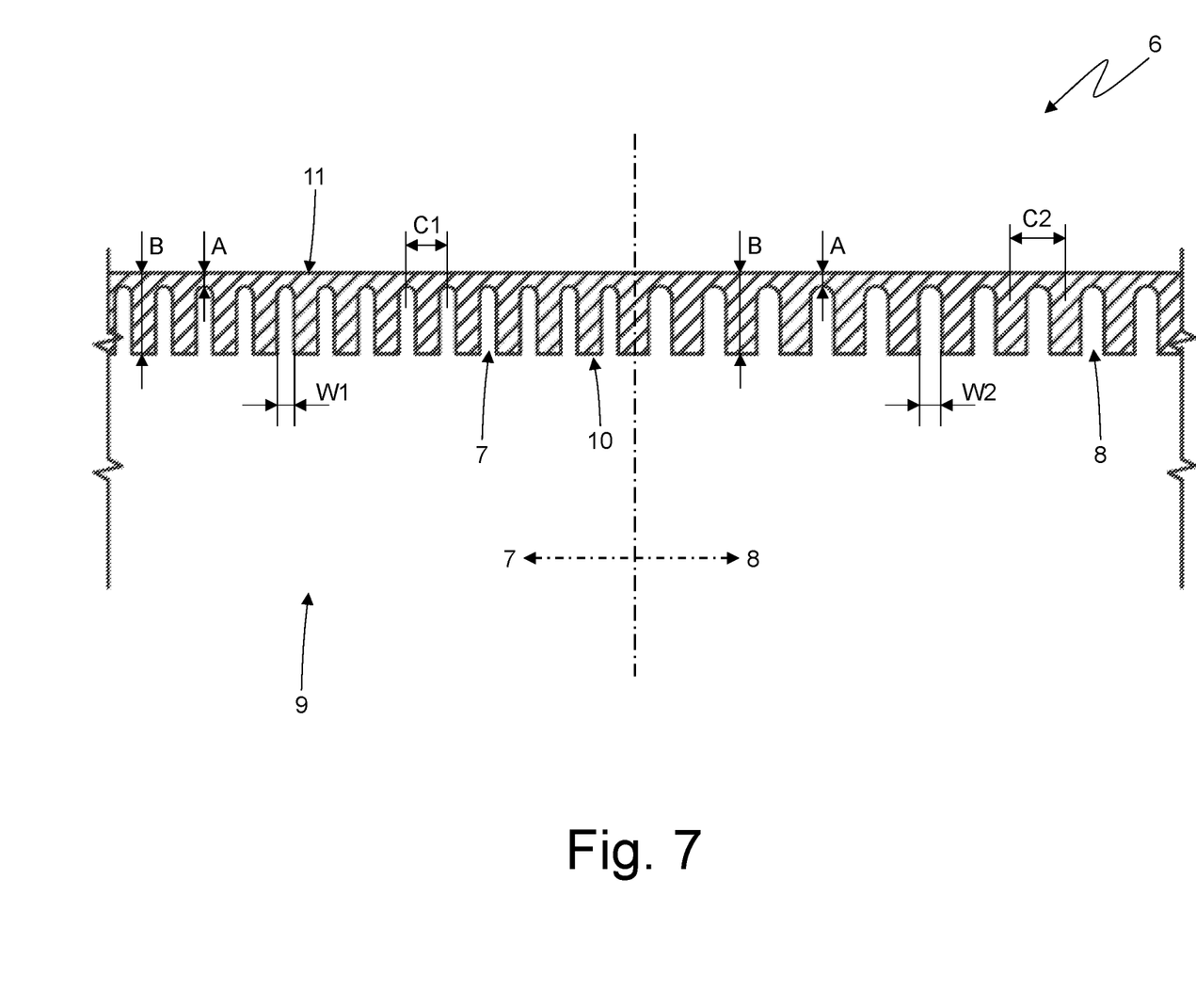
FIG. 7 is a transverse sectional view of the cover panel of FIG. 1 at the weakening.

As better illustrated in FIG. 7, all the incisions 7 and 8 have the exact same depth (measured perpendicularly to the cover panel 4); i.e. the incisions 7 and 8 do not differ from one another by depth. However, according to a different embodiment not illustrated, the incisions 7 and 8 could have different depths; i.e. the incisions could differ from one another by depth.

Moreover, in some sections of the weakening line 9 there are incisions 7 each having a width W1 (measured parallel to the cover panel 4) while in other sections of the weakening line 9 there are incisions 8 each having a width W2 (measured parallel to the cover panel 4) greater than the width W1; i.e. the incisions 7 and 8 differ from one another by a different width W1 and W2.

According to a preferred, but non-limiting, embodiment, the width W2 is between 1.4 and 1.6 times the width W1; in particular, the width W1 is between 0.15 and 0.25 times an overall thickness B of the cover panel 4 while the width W2 is between 0.2 and 0.4 times the overall thickness B of the cover panel 4.

The incisions 7 have a pitch C1 and the incisions 8 have a pitch C2 greater than the pitch C1; i.e. the incisions 7 and 8 differ from one another by a different pitch C1 and C2. According to a preferred, but non-limiting, embodiment, the pitch C2 is between 1.3 and 1.4 times the pitch C1; in particular, the pitch C2 is between 0.6 and 0.7 times the overall thickness B of the cover panel 4 while the pitch C1 is between 0.45 and 0.55 times the overall thickness B of the cover panel 4.

Figure 2:
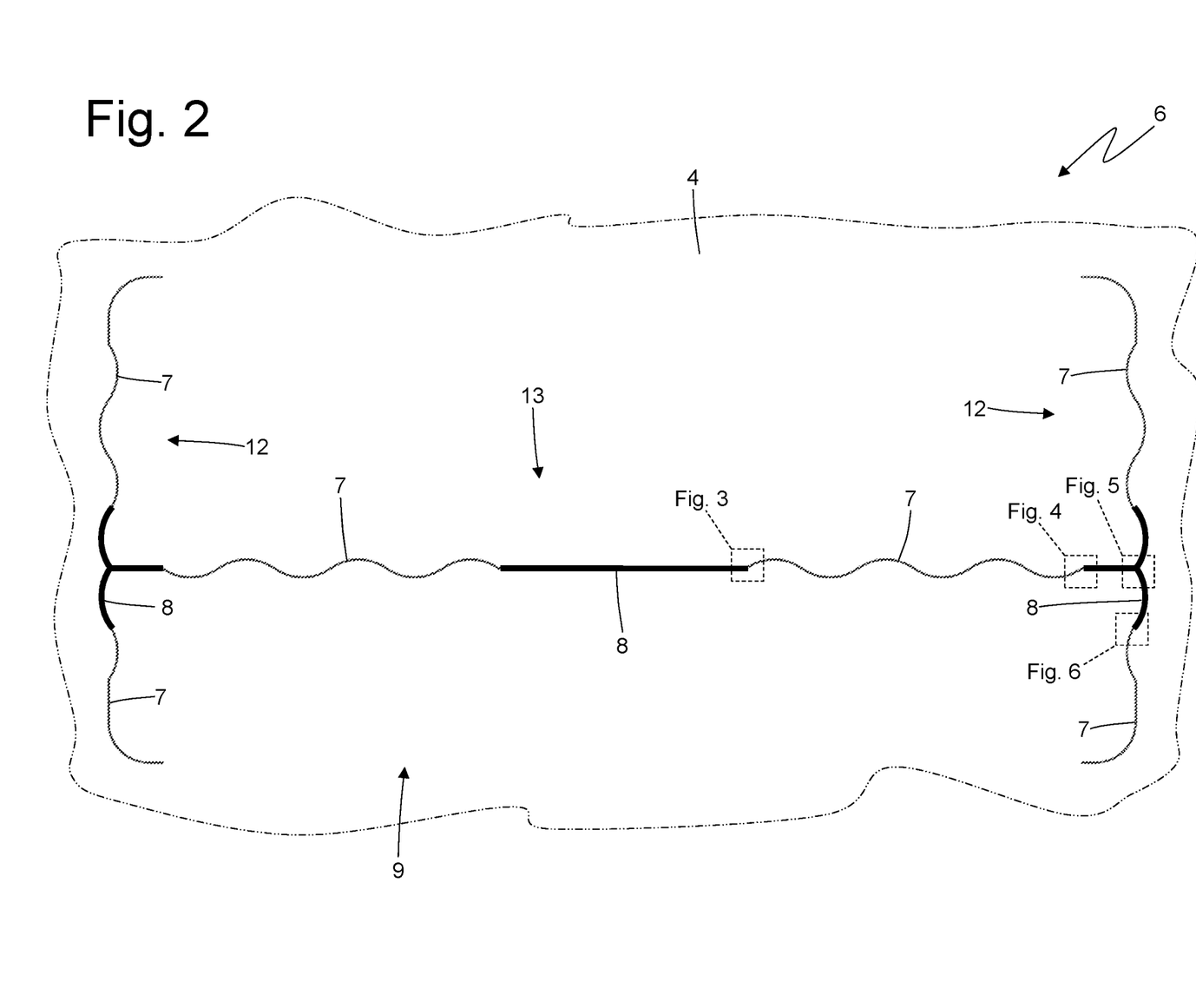
FIG. 2 is a partial plan view of the cover panel of FIG. 1 illustrating the weakening.
Figure 3:
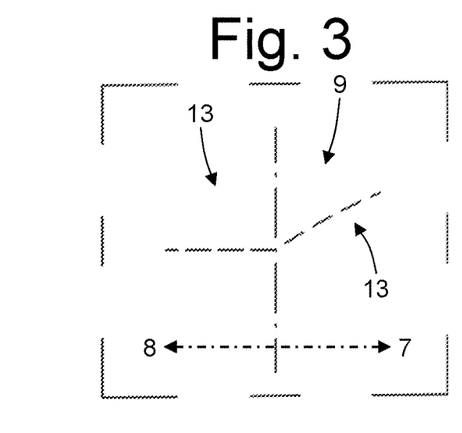
FIGS. 3-6 are enlarged scale views of respective details of FIG. 2.
Figure 4:
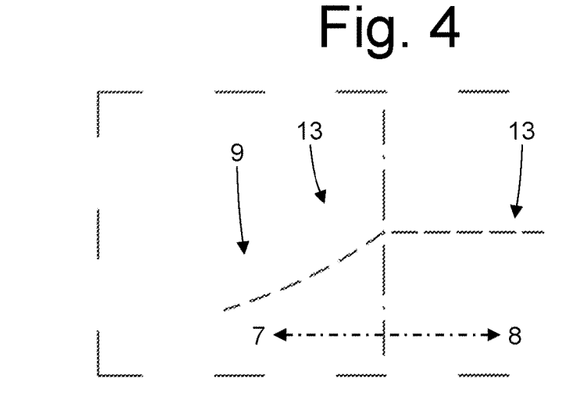
Figure 5:
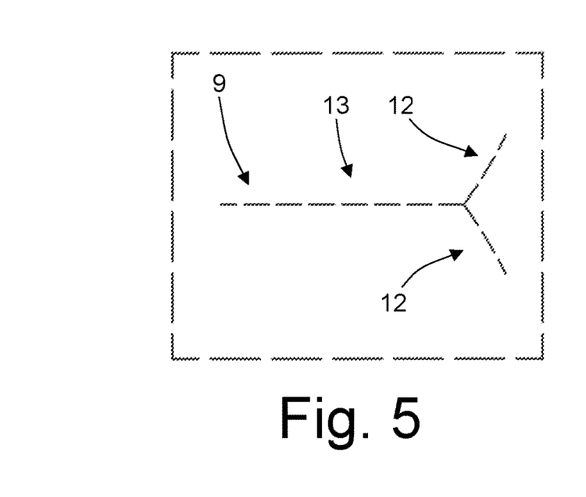
Figure 6:
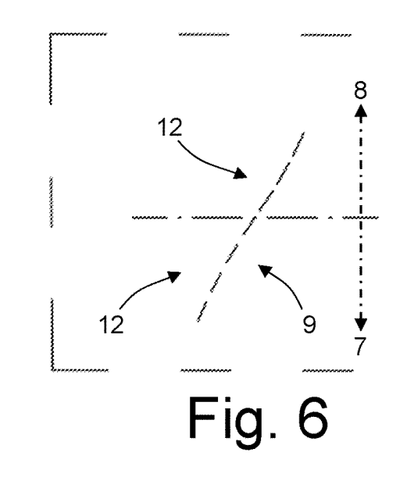

As illustrated in FIG. 2, the weakening line 9 has an "H" shape having two side portions 12 parallel to and opposite one another and an intermediate portion 13 that centrally connects the two side portions 12 to one another; consequently, the weakening line 9 has two connection areas, in each of which the intermediate portion 13 connects to a corresponding side portion 12. The incisions 8 are provided only in a central area (illustrated with a greater thickness in FIG. 2) of the intermediate portion 13, and in the two connection areas (illustrated with a greater thickness in FIG. 2) between the intermediate portion 13 and the side portions 12. In particular, in each connection area the incisions 8 are present both in the intermediate portion 13 and in the side portion 12 so that, in each connection area, the incisions 8 constitute a "T" shape (illustrated with a greater thickness in FIG. 2).

According to a preferred, but non-limiting, embodiment, in the intermediate portion 13 the weakening line 9 has a straight shape in correspondence with the incisions 8 and has a curved wave shape (in particular a sinusoid) in correspondence of the incisions 7. Moreover, each side portion 12 has both straight and curved wave-shaped sections (in particular a sinusoid). In each side portion 12 there are only two small straight-shaped sections arranged at the two ends, while each side portion 12 has a curved wave shape, in particular a sinusoid, also at the connection area with the intermediate portion 13.

According to a preferred, but non-limiting, embodiment, at each incision 7 or 8 the cover panel 4 has a residual thickness A between 0.15 and 0.2 times the overall thickness B of the cover panel 4.

Figure 8:
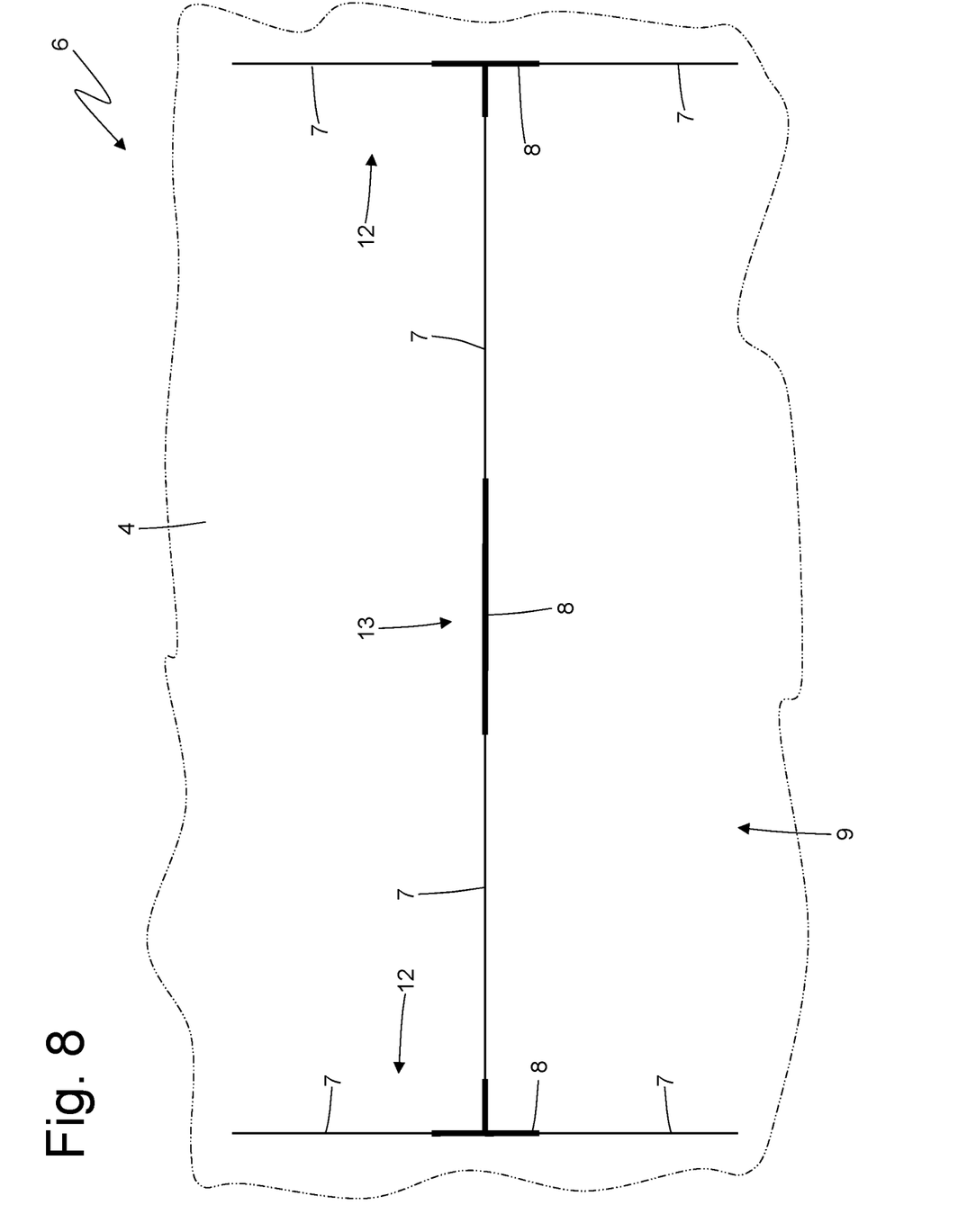
FIG. 8 is a partial plan view of the cover panel of FIG. 1 illustrating a different embodiment of the weakening.

The embodiment illustrated in FIG. 8 differs from the embodiment illustrated in FIG. 2 by the absence of the curved wave shape in the weakening line 9 having an "H" shape; i.e., in the embodiment illustrated in FIG. 8, the weakening line 9 (having an shape) is completely rectilinear everywhere (thus without curved wave-shaped sections).

Figure 9:
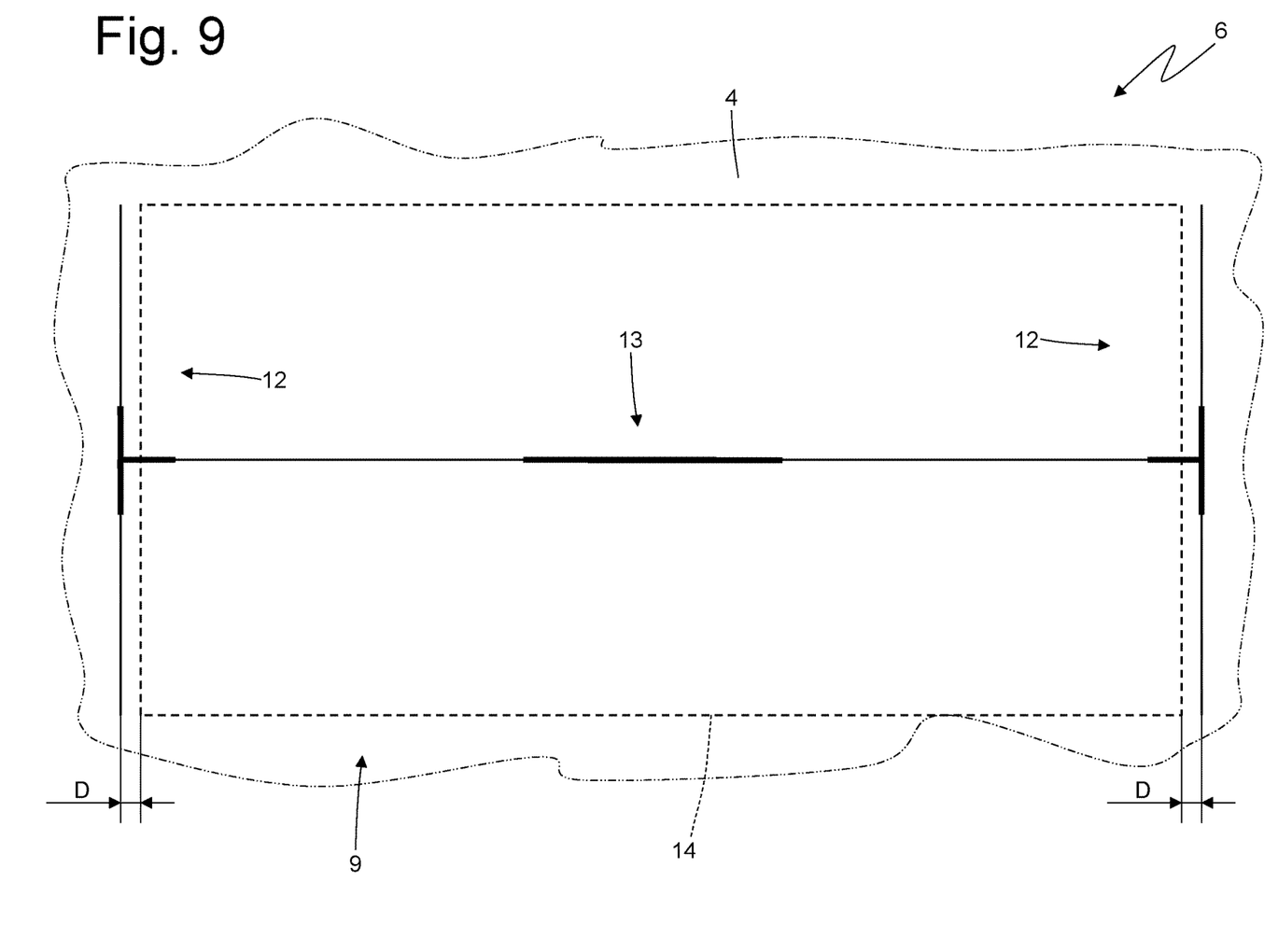
FIG. 9 is a plan view of the cover panel of FIG. 8 illustrating the position of a deployment channel of the underlying airbag.

As illustrated in FIG. 9, the two side portions 12 of the weakening line 9 configured as an "H" are arranged further outwards with respect to the edge of a deployment channel 14 of the airbag 5; in particular, the two side portions 12 of the weakening line 9 configured as an "H" are arranged at a distance D (greater than 2 mm and preferably equal to 3 mm) from the edge of the deployment channel 14 of the airbag 5. This way, it is possible to ensure a deployment of the airbag 5 with no obstacles in spite of (by compensating) all position tolerances of the cover panel 4 with respect to the airbag 5. Obviously, the same "tolerance" (i.e. a distance D greater than 2 mm between the side portions 12 of the weakening line 9 from the edge of the deployment channel 14 of the airbag 5) is preferably also provided in the embodiment illustrated in FIG. 2 wherein the weakening line 9 has rectilinear sections with curved wave-shaped sections arranged between them.

Figure 10:
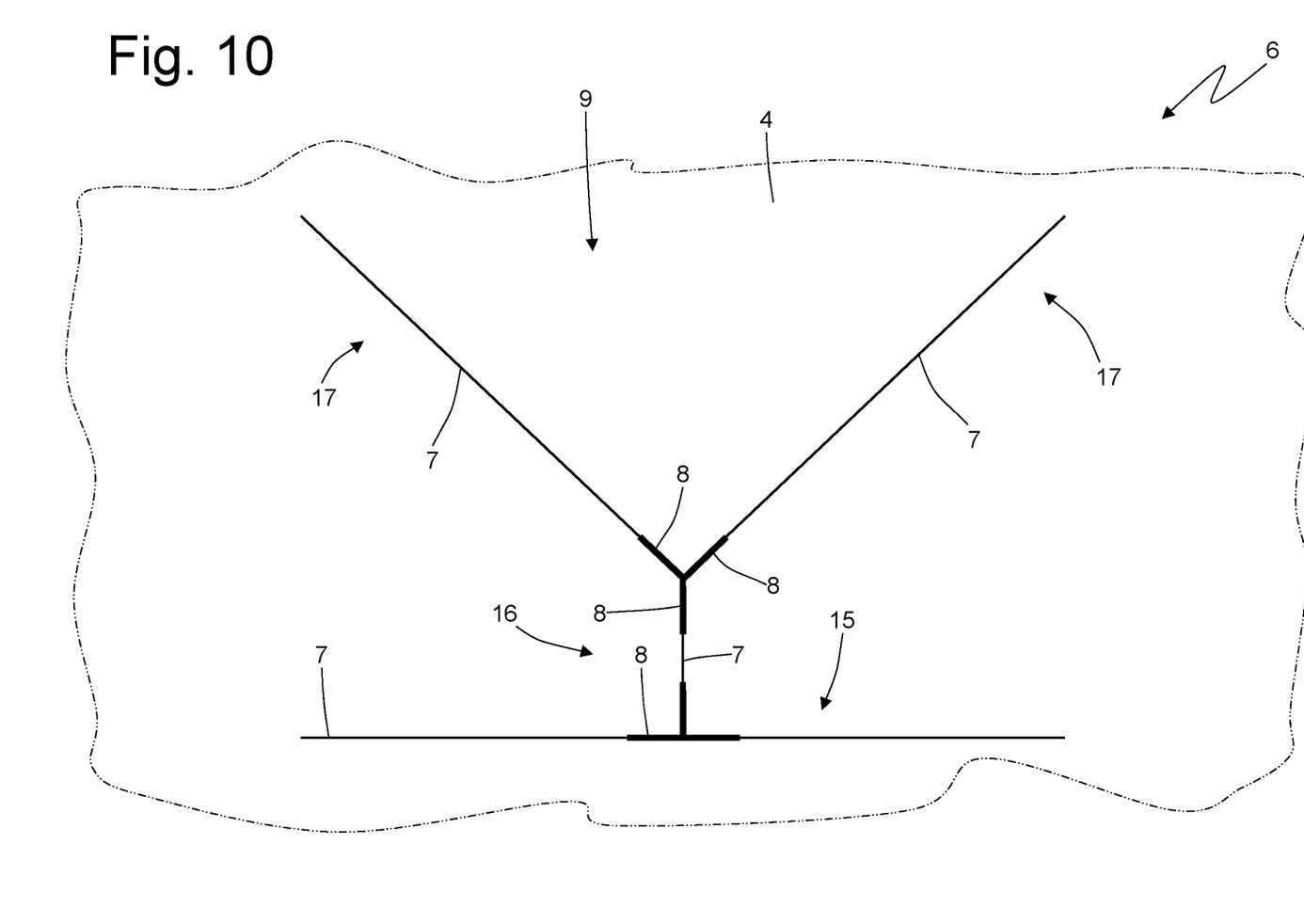
FIG. 10 is a partial plan view of the cover panel of FIG. 1 illustrating a further embodiment of the weakening.

The embodiment illustrated in FIG. 10 differs from the embodiment illustrated in FIGS. 2 and 8 by the different configuration of the weakening line 9: in the embodiment illustrated in FIGS. 2 and 8, the weakening line 9 has an "H" shape constituted by two side portions 12 connected to one another by an intermediate portion 13, while in the embodiment illustrated in FIG. 10 the weakening line 9 has a "Y" shape (i.e. a "chalice" shape) constituted by a base portion 15, by an intermediate portion 16, and by two diverging portions 17 which originate at the intermediate portion 16 and diverge with respect to one another, thus forming a 90° angle between one another; consequently, the weakening line 9 has two connection areas in which the intermediate portion 16 connects to the base portion 15 and in which the intermediate portion 16 connects to the diverging portions 17. In particular, the intermediate portion 16 is perpendicular to the base portion 15, connects to the base portion 15 at a midpoint of the base portion 15 and forms a 45° angle with each diverging portion 17. According to a different embodiment not illustrated, the angle between the two diverging portions 17 could be different from 90° (and, consequently, the angle formed between the intermediate portion 16 and each diverging portion 17 could be different from 45°). According to a different embodiment not illustrated, the weakening line 9 configured as a "Y" does not have the base portion 15, i.e. is constituted by the intermediate portion 16 and by the two diverging portions 17 only; in this embodiment, there is only one connection area between the intermediate portion 16 and the two diverging portions 17.

As illustrated in FIG. 10, the incisions 8 are only provided in the two connection areas (illustrated with a greater thickness in FIG. 10) between the intermediate portion 16 and the base portion 15 on one side and the intermediate portion 16 and the diverging portions 17 on the other side. In particular, in each connection area the incisions 8 are provided both in the intermediate portion 16 and in the portions 15 and 17 so that in each connection area the incisions 8 constitute a "T" shape or a "Y" shape (illustrated with a greater thickness in FIG. 10).

Figure 11:
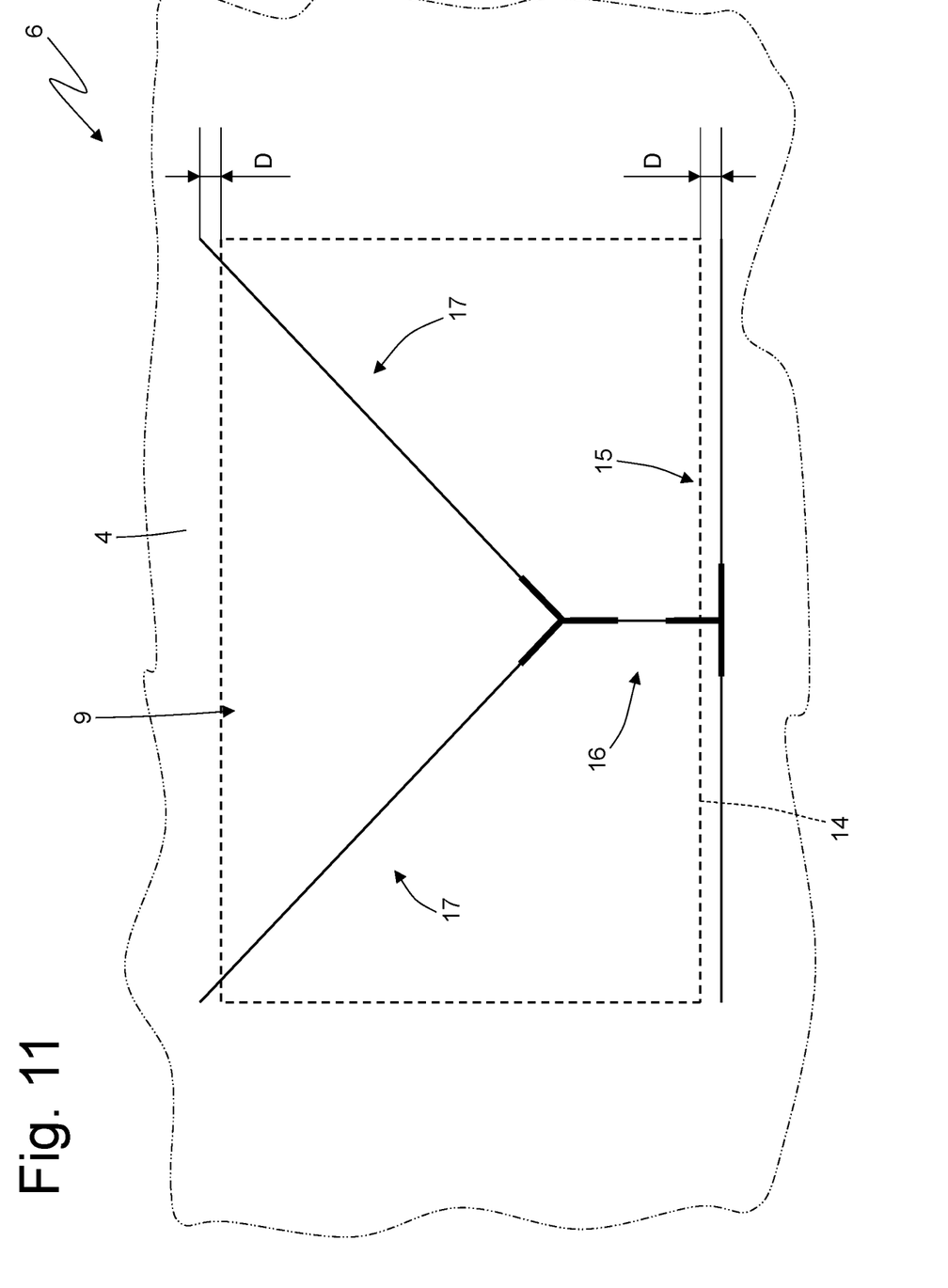
FIG. 11 is a plan view of the cover panel of FIG. 10 illustrating the position of a deployment channel of the underlying airbag.

In the embodiment illustrated in FIGS. 10 and 11, the weakening line 9 configured as a "Y" only has rectilinear sections; according to a different embodiment not illustrated, the weakening line 9 configured as a "Y" could have some rectilinear sections and some curved wave-shaped sections (as illustrated in FIG. 2), i.e. could have rectilinear sections with curved wave-shaped sections arranged between them (as in the embodiment illustrated in FIG. 2).

As illustrated in FIG. 11, the base portion 15 and the vertexes of the diverging portions 17 of the weakening line 9 configured as a "Y" are arranged further outwards with respect to the edge of the deployment channel 14 of the airbag 5; in particular, the base portion 15 and the vertexes of the diverging portions 17 of the weakening line 9 configured as a "Y" are arranged at a distance D (greater than 2 mm and preferably equal to 3 mm) from the edge of the deployment channel 14 of the airbag 5. This way, it is possible to ensure a deployment of the airbag 5 with no obstacles in spite of (by compensating) all tolerances relating to the positioning of the cover panel 4 with respect to the airbag 5.

Summarizing the foregoing, in some sections of the weakening line 9 there are only "standard" incisions 7 each having the width W1, while in other sections of the weakening line 9 there are only "augmented" incisions 8 each having the width W2 greater than the width W1; in particular, in each connection area, the corresponding portions 12-17 of the weakening line 9 consist of the "augmented"

incisions 8 only while, next to each connection area, the corresponding portions 12-17 of the weakening line 9 consist of the "standard" incisions 7 only. In both configurations of the weakening line 9 (i.e. both in the weakening line 9 configured as an "H" and in the weakening line 9 configured as a "Y"), the "augmented" incisions are only present in each connection area and in a central area of the weakening line 9; in this regard, it is important to note that, in the weakening line 9 configured as a "Y", the central area of the weakening line 9 coincides with the connection area between the base portion 15 and the diverging portions 17.

The cover panel 4 having the weakening 6 can be made of any type of material such as, for example, a hard polyurethane foam.

The embodiments described herein can be combined with one another without departing from the scope of protection of the present invention.

The cover panel 4 described in the foregoing has numerous advantages.

First of all, the cover panel 4 described in the foregoing allows an optimal opening of the underlying airbag and, simultaneously, does not show any trace of the weakening 6 (i.e. the weakening 6 is completely invisible for anyone inside the cabin 2 regardless of their point of view or the current illumination).

Moreover, the weakening 6, while allowing an optimal opening of the underlying airbag 5, ensures that the violent opening of the airbag 5 does not cause the detachment of parts of the cover panel 4 which could be thrust with violence against the occupants of the automobile 1.

Finally, the cover panel 4 described in the foregoing is easy and inexpensive to manufacture as the weakening 6 can be made quickly by means of a laser cutting instrument (for example using the femtosecond technology) that is readily available on the market.

LIST OF REFERENCE NUMERALS OF THE FIGS

- 1 automobile
- 2 cabin
- 3 dashboard
- 4 cover panel
- 5 airbag
- 6 weakening
- 7 incisions
- 8 incisions
- 9 weakening line
- 10 internal surface
- 11 external surface
- 12 side portions
- 13 intermediate portion
- 14 deployment channel
- 15 base portion
- 16 intermediate portion
- 17 diverging portions
- A thickness
- B thickness
- C pitch
- W1 width
- W2 width
- D distance

The invention claimed is:

1. A cover panel (4) for a cabin (2) of a vehicle (1) and provided with a weakening (6) for the opening of an underlying airbag (5); the weakening (6) consists of a sequence of not-through incisions (7, 8) which are separated from each other, are arranged along a weakening line (9), are obtained from an internal surface (10) of the cover panel (4), and terminate at a non-zero distance from an external surface (11) of the cover panel (4);
    wherein in some sections of the weakening line (9) there are only first incisions (7) each having a first width (W1) while in other sections of the weakening line (9) there are only second incisions (8) each having a second width (W2) greater than the first width (W1);
    wherein the weakening line (9) comprises a plurality of portions (12-17) that connect to one another in at least one connection area; and
    wherein, in each connection area, the corresponding portions (12-17) of the weakening line (9) consist of the second incisions (8) only while, next to each connection area, the corresponding portions (12-17) of the weakening line (9) consist of the first incisions (7) only.

2. The cover panel (4) according to claim 1, wherein:
    the weakening line (9) has an "H" shape comprising two side portions (12) parallel to each other and opposite one from the other and an intermediate portion (13) connecting centrally the two side portions (12); and
    there are two connection areas in each of which the intermediate portion (13) connects to a corresponding side portion (12).

3. The cover panel (4) according to claim 2, wherein a central area of the intermediate portion (13) also consists of the second incisions (8) only while, next to the central area, the intermediate portion (13) consists of the first incisions (7) only.

4. The cover panel (4) according to claim 3, wherein the second incisions (8) are only present in the central area of the intermediate portion (13) and in the two connection areas between the intermediate portion (13) and the side portions (12).

5. The cover panel (4) according to claim 2, wherein the two side portions (12) of the weakening line (9) configured as an "H" are arranged at a distance (D) greater than 2 mm.

6. The cover panel (4) according to claim 2, wherein in the intermediate portion (13) the weakening line (9) has a straight shape in correspondence with the second incisions (8) and has a curved wave shape, in particular sinusoidal shape, in correspondence of the first incisions (7).

7. The cover panel (4) according to claim 2, wherein each side portion (12) has both straight and curved wave-shaped sections, in particular sinusoidal shape.

8. The cover panel (4) according to claim 2, wherein each side portion (12) has a curved wave shape, in particular sinusoidal shape, at the connection area with the intermediate portion (13).

9. The cover panel (4) according to claim 2, wherein the two side portions (12) of the weakening line (9) configured as an "H" are arranged at a distance (D) equal to 3 mm from an edge of a deployment channel (14) of the airbag (5).

10. The cover panel (4) according to claim 1, wherein:
    the weakening line (9) has a "Y" shape comprising an intermediate portion (16) and two diverging portions (17) that originate at the intermediate portion (16) and diverge with respect to one another; and
    there is at least one connection area in which the intermediate portion (16) connects to the two diverging portions (17).

11. The cover panel (4) according to claim 10, wherein:
    the weakening line (9) also comprises a base portion (15);
    the intermediate portion (16) is perpendicular to the base portion (15) and connects to the base portion (15) at a midpoint of the base portion (15); and there are two connection areas in which the intermediate portion (16) connects to the two diverging portions (17) and in which the intermediate portion (16) connects to the base portion (15).

12. The cover panel (4) according to claim 10, wherein the second incisions (8) are only provided in each connection area.

13. The cover panel (4) according to claim 10, wherein the base portion (15) and the vertexes of the diverging portions (17) of the weakening line (9) configured as a "Y" are arranged at a distance (D) greater than 2 mm.

14. The cover panel (4) according to claim 10, wherein the base portion (15) and the vertexes of the diverging portions (17) of the weakening line (9) configured as a "Y" are arranged at a distance (D) equal to 3 mm from an edge of a deployment channel (14) of the airbag (5).

15. The cover panel (4) according to claim 1, wherein the second incisions (8) are only provided in each connection area and in a central area of the weakening line (9).

16. The cover panel (4) according to claim 1, wherein the weakening line (9) has rectilinear sections with curved wave-shaped, in particular sinusoidal, sections arranged between them.

17. The cover panel (4) according to claim 1, wherein:

the second width (W2) is between 1.4 and 1.6 times the first width (W1); the first width (W1) is between 0.15 and 0.25 times an overall thickness (B) of the cover panel (4); and the second width (W2) is between 0.2 and 0.4 times the overall thickness (B) of the cover panel (4).

18. The cover panel (4) according to claim 1, wherein the first incisions (7) have a first pitch (C1) and the second incisions (8) have a second pitch (C2) greater than the first pitch (C1).

19. The cover panel (4) according to claim 1, wherein the first incisions (7) and the second incisions (9) all have the same depth.

20. The cover panel (4) according to claim 1, wherein the first incisions (7) have a first pitch (C1) and the second incisions (8) have a second pitch (C2) between 1.3 and 1.4 times the first pitch (C1).

* * * * *